(12) United States Patent
Prince et al.

(10) Patent No.: US 12,187,442 B2
(45) Date of Patent: Jan. 7, 2025

(54) SYSTEM FOR PROVIDING PROTECTION FROM ICING USING A FUEL CELL

(71) Applicant: LIEBHERR-AEROSPACE TOULOUSE SAS, Toulouse (FR)

(72) Inventors: Karin Prince, Toulouse (FR); David Lavergne, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 88 days.

(21) Appl. No.: 18/030,797

(22) PCT Filed: Oct. 6, 2021

(86) PCT No.: PCT/EP2021/077521
§ 371 (c)(1),
(2) Date: Apr. 7, 2023

(87) PCT Pub. No.: WO2022/074040
PCT Pub. Date: Apr. 14, 2022

(65) Prior Publication Data
US 2023/0382537 A1    Nov. 30, 2023

(30) Foreign Application Priority Data

Oct. 7, 2020  (FR) ...................................... 2010250

(51) Int. Cl.
| B64D 15/06 | (2006.01) |
| H01M 8/0267 | (2016.01) |
| H01M 8/04701 | (2016.01) |
| B64D 41/00 | (2006.01) |

(52) U.S. Cl.
CPC .......... B64D 15/06 (2013.01); H01M 8/0267 (2013.01); H01M 8/04723 (2013.01); *B64D 2041/005* (2013.01); *H01M 2250/20* (2013.01)

(58) Field of Classification Search
CPC .. B64D 15/06; B64D 2041/005; B64D 15/02; H01M 8/0267; H01M 8/04723; H01M 2250/20; Y02T 90/40
See application file for complete search history.

(56) References Cited

U.S. PATENT DOCUMENTS

2016/0036071 A1*  2/2016  Klewer ............. H01M 8/04044
                                                                429/435

FOREIGN PATENT DOCUMENTS

FR          2996064 A1       3/2014

* cited by examiner

*Primary Examiner* — Valentina Xavier
(74) *Attorney, Agent, or Firm* — CRGO Global; Steven M. Greenberg

(57) ABSTRACT

System for protecting an outer surface of an aircraft comprising at least two fuel cells (112, 212) from icing, characterized in that it comprises a first and a third liquid circuit (114, 214) each causing a cooling liquid of the fuel cells (112, 212) to flow, a second and a fourth liquid circuit (118a, 118b) each causing an icing protection liquid to flow, at least two icing protection heat exchangers (120a-d, 220a-d) arranged on the outer surface of the aircraft and having each icing protection liquid pass through them when it flows in the second or fourth liquid circuit (118a, 118b), and two liquid-liquid heat exchangers (116, 216) in which the cooling liquids form a hot pass and the icing protection liquids form a cold pass to reheat the icing protection liquid by the heat from the cooling liquids.

10 Claims, 2 Drawing Sheets

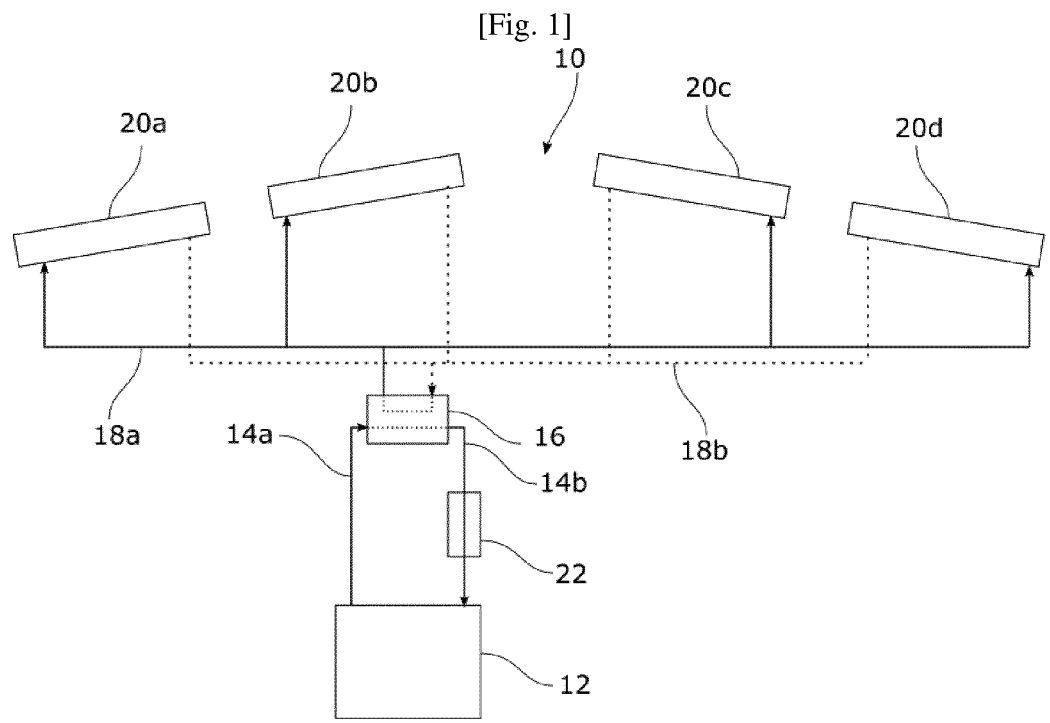
[Fig. 1]
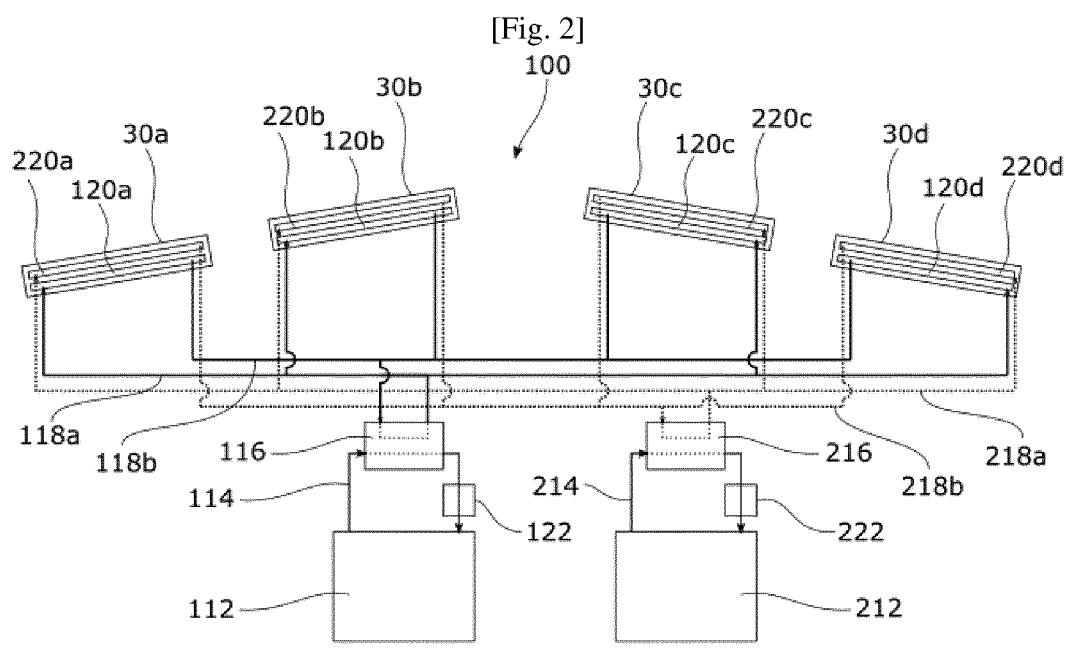
[Fig. 2]

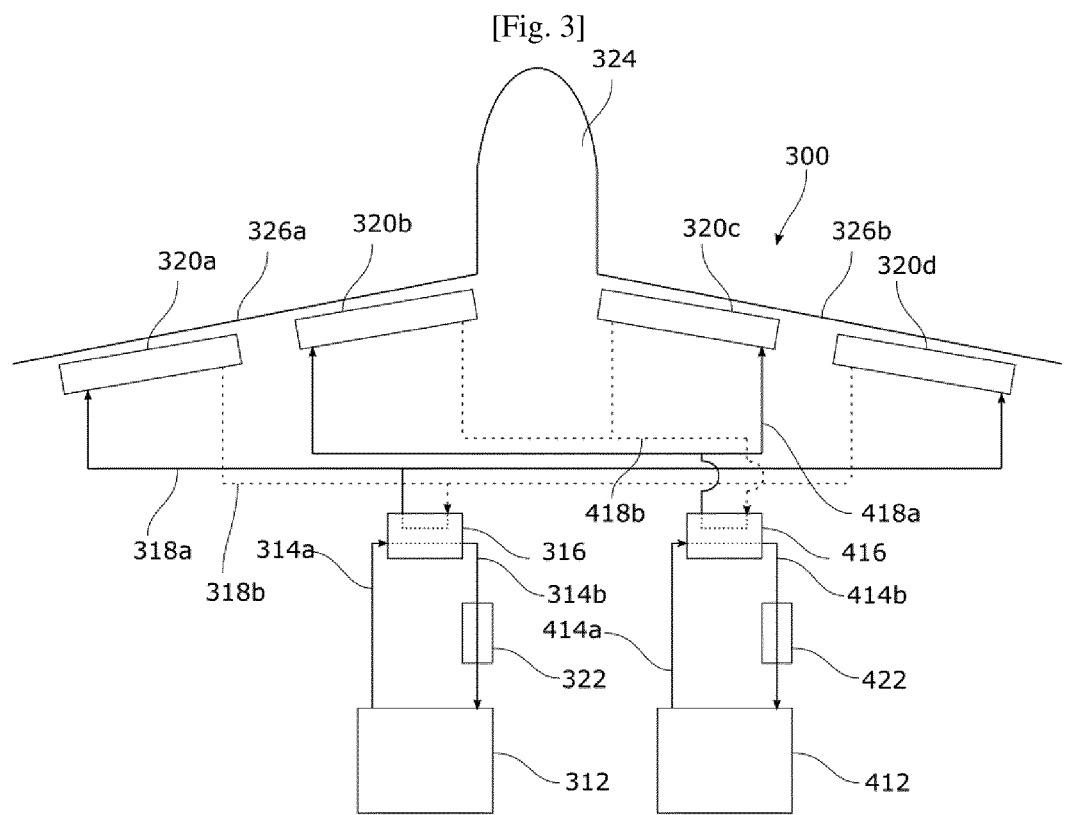
[Fig. 3]
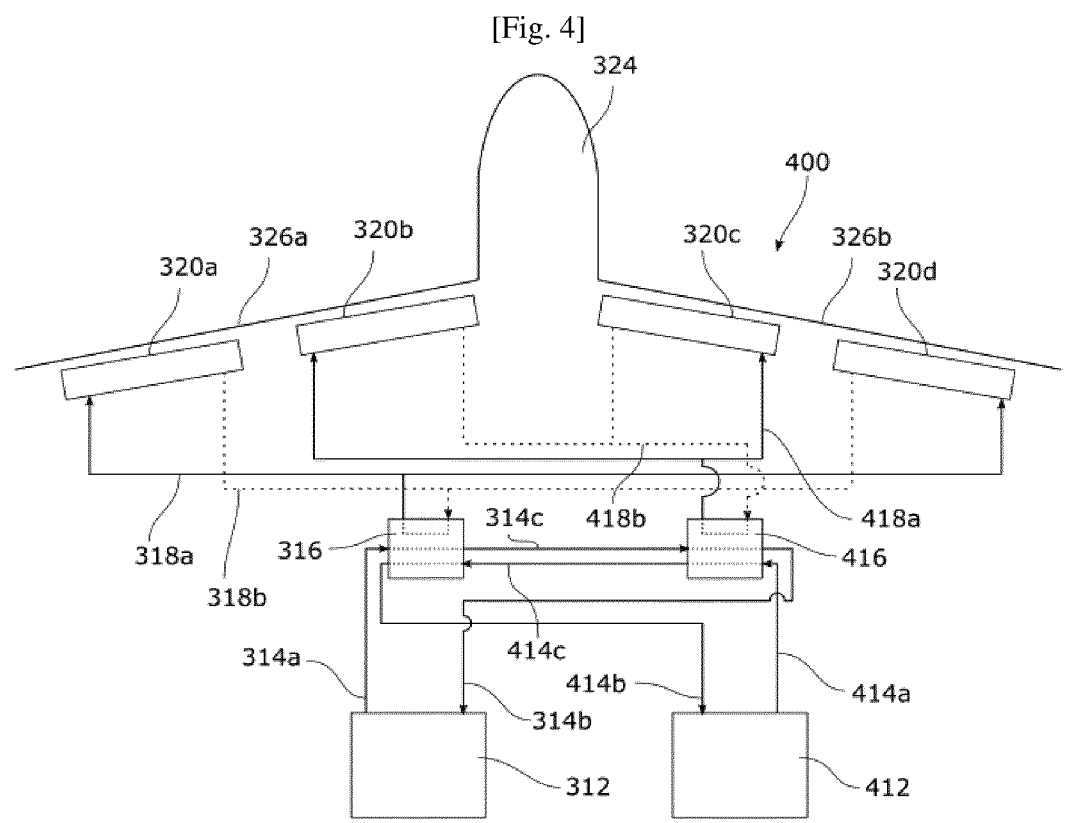
[Fig. 4]

SYSTEM FOR PROVIDING PROTECTION FROM ICING USING A FUEL CELL

CROSS-REFERENCE TO RELATED APPLICATIONS

This application is a § 371 national phase entry of International Application No. PCT/EP2021/077521, filed Oct. 6, 2021, which claims priority to French Patent Application No. 2010250 filed on Oct. 7, 2020.

TECHNICAL FIELD OF THE INVENTION

The invention relates to a system for providing protection from icing. In particular, the invention relates to an icing protection system designed to be used in a vehicle, in particular in an aircraft, in order to avoid the formation of ice or to remove ice already formed in the zones of the aircraft which are sensitive to said formation of ice such as the airfoils, the propulsion engines, the fuselage, the fin, the horizontal stabilizer, etc.

TECHNOLOGICAL BACKGROUND

In an aircraft, the icing protection systems are generally implemented by blowing hot air or by electric foils with power cycling permitting the temperature of the outer surface of the part it is desired to protect to be kept at a positive temperature.

Another conventional solution for some aircraft, in particular small aircraft, is to use boots disposed on the leading edge, which break the accreted ice by virtue of an injection of compressed air at regular intervals.

The electric foils are e.g. supplied with electricity by a fuel cell or an electric generator connected to a propulsion engine or an auxiliary power assembly of the aircraft, and generate heat.

Other solutions have been proposed, making use of a two-phase loop system. However, these systems are complex, are not adapted to high levels of power and present problems which are hard to overcome in an aircraft owing to gravitation and the orientation and variable movements of the aircraft.

The inventors have sought to find an alternative to the prior art icing protection systems.

AIMS OF THE INVENTION

The invention aims to provide an icing protection system, permitting the use of the heat from fuel cells rather than the electricity provided by said cells.

In particular, the invention aims to provide, in at least one embodiment, an icing protection system, permitting the electric power required in the aircraft on which it is mounted to be reduced.

The invention also aims to provide, in at least one embodiment of the invention, an icing protection system, permitting the impact of drag of the cooling system of the fuel cells mounted in the aircraft to be limited.

The invention also aims to provide, in at least one embodiment of the invention, a reliable icing protection system which has redundancy.

DESCRIPTION OF THE INVENTION

In order to achieve this, the invention relates to a system for protecting an outer surface of an aircraft from icing, comprising a first fuel cell and a second fuel cell, characterized in that it comprises:

- at least a first liquid circuit configured to cause a first cooling liquid of the first fuel cell to flow,
- at least a second liquid circuit configured to cause a first icing protection liquid to flow,
- at least a third liquid circuit configured to cause a second cooling liquid of the second fuel cell to flow,
- at least a fourth liquid circuit configured to cause a second icing protection liquid to flow,
- at least one first icing protection heat exchanger arranged on the outer surface of the aircraft to be protected and configured to have the first icing protection liquid pass through it when it flows in the second liquid circuit, and one second icing protection heat exchanger arranged on the outer surface of the aircraft to be protected and configured to have the second icing protection liquid pass through it when it flows in the fourth liquid circuit, and
- at least a first liquid-liquid heat exchanger, in which the first cooling liquid forms a hot pass and the first icing protection liquid forms a cold pass, so as to reheat the first icing protection liquid by transmission of heat coming from the first cooling liquid of the first fuel cell, and a second liquid-liquid heat exchanger in which the second cooling liquid forms a hot pass and the second icing protection liquid forms a cold pass, so as to reheat the second icing protection liquid by transmission of heat coming from the second cooling liquid of the second fuel cell.

An icing protection system according to the invention thus permits use of the heat given off by the fuel cells during operation thereof, and at the same time permits cooling of the fuel cells. The icing protection system thus permits a reduction in the need for cooling of the fuel cells by an external source, e.g. dynamic air of the ram air type and at the same time a reduction in the energy consumption of the icing protection heat exchanger, in particular the energy consumption induced by the drag of the aircraft.

The fuel cells of the icing protection system do not have to provide electric power in order to ensure protection from icing, and can thus be under-dimensioned with respect to a system based on the current principles where protection from icing is ensured by electric foils supplied with electricity by the fuel cells. The fuel cells, which form part of an electricity-generation system of the aircraft permitting the supply of electrical energy, can thus use the electrical energy produced to supply other devices on the aircraft.

The presence of the two fuel cells permits redundancy to be obtained in the function of protecting said outer surface of the aircraft from icing for the event that one of the two fuel cells fails.

When, in a conventional manner of operation, the cooling liquids of each fuel cell have a maximum temperature of the order of 90° C. to 100° C., the icing protection system makes it possible to dispense with means for protecting the surface from overheating, as may be necessary with other prior art icing protection systems. In particular, the icing protection liquids flowing in the second and fourth liquid circuit are generally at a temperature lower than the cooling liquids of the fuel cells, which further reduces the risks of overheating.

Protection from icing designates both anti-icing-type protection, i.e. which prevents the formation of ice, or a de-icing-type protection which removes ice already formed by causing partial melting thereof or by breaking it. Anti-icing protection is of high priority in preventing any poor functioning of the surface to be protected but some surfaces may require only de-icing if they are less sensitive.

The surface to be protected is e.g. the airfoil of the aircraft (in particular the leading edges), the nacelle, the horizontal stabilizer, the fin, etc. When the surface to be protected is a moveable surface, the icing protection liquids can be fed to the heat exchangers via telescopic ducts permitting adaptation to the movement of the surface.

The presence of the liquid-liquid heat exchangers permits dissociation between the function of cooling the fuel cells, effected by the cooling liquids, and the icing protection function effected by the icing protection liquids. The dissociation provides better reliability by safeguarding each of the functions. In particular, the function of cooling the fuel cells must be effected reliably to avoid any malfunction of the fuel cells by heating thereof.

Furthermore, the cooling liquid is a deionized liquid in order to be usable in the fuel cells (e.g. deionized propylene glycol or deionized ethylene glycol), which makes it a more corrosive liquid. Thus it is advantageous to limit its circulation to the fuel cells and to the liquid-liquid heat exchanger, whereas a non-deionized liquid (e.g. propylene glycol or ethylene glycol) can be used as an icing protection liquid because it is less corrosive.

The invention only uses liquids and liquid-liquid heat exchangers without the presence of a two-phase-type refrigerant system which is more expensive, bulkier and less reliable for use in an icing protection system.

Advantageously and in accordance with the invention, at least one icing protection heat exchanger is a skin heat exchanger configured to be arranged on the outer surface of the aircraft in direct contact with the outside of the aircraft.

According to this aspect of the invention, the icing protection liquid can be fed very close to the outside of the aircraft in order to maximize the protection from icing by maximizing the thermal exchanges with the outside.

A skin heat exchanger is understood to be a heat exchanger which replaces an element of the skin of the aircraft, which forms the outer surface of the fuselage of the aircraft, while retaining the same aerodynamic characteristics as the replaced element of the skin. In particular, the skin heat exchanger does not induce any additional drag.

Advantageously and in accordance with the invention, at least one icing protection heat exchanger is arranged on the airfoil of the aircraft, and at least partly forms a leading edge of the airfoil.

According to this aspect of the invention, the leading edge of the airfoil of the aircraft is one of the surfaces most subject to ice and one of the largest surfaces to protect owing to the large size of the airfoils.

Advantageously and in accordance with the invention, the first cooling liquid forms an additional hot pass of the second liquid-liquid heat exchanger, and the second cooling liquid forms an additional hot pass of the first liquid-liquid heat exchanger.

According to this aspect of the invention, in the event that one of the fuel cells fails, the operation of a single fuel cell permits minimal operation of the anti-icing function for all the icing protection heat exchangers connected to all of the liquid-liquid heat exchangers.

In an advantageous manner, an icing protection system in accordance with the invention comprises at least one set of heat exchangers, each group of heat exchangers comprising a first icing protection heat exchanger configured to have the first icing protection liquid pass through it and a second icing protection heat exchanger configured to have the second icing protection liquid pass through it, the first icing protection heat exchanger and the second icing protection heat exchanger of the same set of heat exchangers being arranged to protect the same outer surface of the aircraft from icing.

According to this aspect of the invention, each set of heat exchangers thus comprises at least two icing protection heat exchangers, each supplied by a different fuel cell in order to create the redundancy of the system for the event that one of the two fuel cells fails.

Advantageously and in accordance with the invention, the system comprises a complementary heat exchanger, arranged in at least one of the first or third liquid circuits, in which the cooling liquid of the fuel cell forms a hot pass.

According to this aspect of the invention, the complementary heat exchanger permits cooling of the fuel cell with which it is associated when the icing protection is not being used, in particular when the aircraft is on the ground. It may also permit additional cooling if the operating conditions do not permit sufficient cooling of the cooling liquid of the fuel cell with only the liquid-liquid heat exchanger, e.g. under certain flight conditions when the fuel cell is under high demand, according to the outside temperature, etc.

The invention also relates to a method for protecting an outer surface of an aircraft from icing, characterized in that it comprises the following steps:
  a step of transferring heat from a first fuel cell to a first cooling liquid of the first fuel cell,
  a step of transferring heat from a second fuel cell to a second cooling liquid of the second fuel cell,
  a step of transferring heat from the first cooling liquid to a first icing protection liquid in a first liquid-liquid heat exchanger,
  a step of transferring heat from the second cooling liquid to a second icing protection liquid in a second liquid-liquid heat exchanger,
  a step of transferring heat from the first icing protection liquid to a first icing protection heat exchanger arranged on the outer surface of the aircraft to be protected,
  a step of transferring heat from the second icing protection liquid to a second icing protection heat exchanger arranged on the outer surface of the aircraft to be protected.

Advantageously and in accordance with the invention, the method further comprises a step of controlling an increase in heat production by at least one fuel cell.

According to this aspect of the invention, a control action permits an increase in the production of heat by said fuel cell in order to permit better protection from icing.

The increase in the production of heat can be effected e.g. by increasing the consumption of the fuel cell (the additional electrical energy created being able to be consumed or stored) or by degraded operation of the fuel cell outside its optimal operating point.

The invention also relates to an aircraft comprising at least one outer surface, characterized in that it comprises a system for protecting said at least one outer surface from icing according to the invention.

Advantageously and in accordance with the invention, the outer surface comprises at least two symmetrical zones, each zone being protected from icing by at least two icing protection heat exchangers of a protection system comprising at least two fuel cells, at least one icing protection heat exchanger being configured to have the first icing protection liquid pass through it and at least one second icing protection heat exchanger configured to have the second icing protection liquid pass through it.

According to this aspect of the invention, this configuration permits a certain symmetry in the use of the two fuel cells and in the protection of the wings from icing. The objective is e.g. to ensure that each wing of an aircraft is protected from icing at least by an icing protection heat exchanger and in a symmetrical manner in the event that one of the two fuel cells fails.

The symmetrical zones of an aircraft are e.g. the airfoils (left and right) the propulsive engines (the engine(s) under the left wing and the engine(s) under the right wing), the fin (left face and right face), the horizontal stabilizer (left and right).

The invention also relates to an icing protection system, an icing protection method and an aircraft, which are characterized in combination by all or some of the features mentioned above or below.

LIST OF FIGURES

Other aims, features and advantages of the invention will become apparent upon reading the following description given solely in a non-limiting way and which makes reference to the attached figures in which:

FIG. 1 is a schematic view of an icing protection system in accordance with a first embodiment of the invention.

FIG. 2 is a schematic view of an icing protection system in accordance with a second embodiment of the invention.

FIG. 3 is a schematic view of an icing protection system in accordance with a third embodiment of the invention.

FIG. 4 is a schematic view of an icing protection system in accordance with a fourth embodiment of the invention.

DETAILED DESCRIPTION OF AN EMBODIMENT OF THE INVENTION

In the figures, for the sake of illustration and clarity, scales and proportions have not been strictly respected.

Furthermore, identical, similar or analogous elements are designated by the same reference signs in all the figures.

FIG. 1 shows an icing protection system 10 in accordance with a first embodiment of the invention.

The icing protection system 10 comprises a fuel cell 12 configured to be cooled by a first liquid circuit in which a cooling liquid flows when the icing protection system 10 is in operation. The first liquid circuit forms a loop composed of two ducts 14a, 14b connecting the fuel cell 12 to a liquid-liquid heat exchanger 16, a first duct 14a in which the cooling liquid flows from the fuel cell 12 to the liquid-liquid heat exchanger 16 and a second duct 14b in which the cooling liquid flows from the liquid-liquid heat exchanger 16 to the fuel cell 12.

The routes shown in dotted lines in the liquid-liquid heat exchanger 16 are only for illustration purposes in order to connect the inlets and outlets of each loop and do not represent one type of heat exchanger in particular. Any type of liquid-liquid heat exchanger compatible with the constraints of the system can be used.

The icing protection system 10 also comprises a second liquid circuit configured to permit the circulation of an icing protection liquid. The second circuit comprises a first set 18a of ducts permitting the anti-icing liquid to flow from the liquid-liquid heat exchanger 16 to at least one, in this case four, icing protection heat exchangers 20a, 20b, 20c, 20d, and a second set 18b of ducts permitting the anti-icing liquid to flow from the icing protection heat exchangers 20a, 20b, 20c, 20d to the liquid-liquid heat exchanger 16. The icing protection heat exchangers 20a, 20b, 20c, 20d are e.g. skin heat exchangers, disposed in contact with the external air. For example, two heat exchangers 20a and 20b are arranged in one of the wings of an aircraft (in this case, the left wing), and two heat exchangers 20c and 20d are arranged in the other wing of the aircraft (in this case, the right wing).

Downstream of the fuel cell, the liquid approaches 90° C. The difference in temperature compared with the temperature encountered in freezing conditions is sufficient to protect the leading edge of the airfoil. The heat from the cooling liquid is thus transmitted to the icing protection liquid, which transmits this heat to the icing protection heat exchangers in order to de-ice or prevent the formation of ice or frost. The cooling liquid is cooled upon passing through the liquid-liquid heat exchanger 16 in order to be able to be used to cool the fuel cell 12. This cooling is all the more important since the icing protection heat exchangers 20a, 20b, 20c, 20d greatly cool the anti-icing liquid owing to their positioning in contact with the external air.

A complementary heat exchanger 22 permits additional cooling to be provided if the liquid-liquid heat exchanger is not sufficient to cool the cooling liquid to the desired temperature, or even to permit all of the cooling of the cooling liquid under specific conditions, in particular when the aircraft is on the ground or in the event that the icing protection system fails. This heat exchanger is e.g. of the liquid-air type and can be cooled by cold air e.g. dynamic air of the ram air type.

FIG. 2 shows an icing protection system 200 in accordance with a second embodiment of the invention.

In this second embodiment, the system comprises two fuel cells 112, 212 permitting redundancy in the icing protection function.

The first fuel cell 112 is cooled by a first cooling liquid flowing in a first liquid circuit 114.

A first icing protection liquid flows in a second liquid circuit 118a, 118b in order to supply at least one, in this case four, first icing protection heat exchangers 120a, 120b, 120c, 120d. The second circuit comprises in particular a first set 118a of ducts permitting the first icing protection liquid to flow from a first liquid-liquid heat exchanger 116 to the four icing protection heat exchangers 120a, 120b, 120c, 120d, and a second set 118b of ducts permitting the first icing protection liquid to flow from the first icing protection heat exchangers 120a, 120b, 120c, 120d to the first liquid-liquid heat exchanger 116.

The first cooling liquid forms a hot pass of the first liquid-liquid heat exchanger 116, and the first icing protection liquid forms the cold pass of the first liquid-liquid heat exchanger 116.

A first complementary heat exchanger 122 permits the first liquid-liquid heat exchanger 116 to be complemented or replaced, as explained above.

The second fuel cell 212 is cooled by a second cooling liquid flowing in a third liquid circuit 214.

A second icing protection liquid flows in a fourth liquid circuit 218 in order to supply at least one, in this case four, second icing protection heat exchangers 220a, 220b, 220c, 220d. The fourth circuit comprises in particular a third set 218a of ducts permitting the second icing protection liquid to flow from a second liquid-liquid heat exchanger 216 to the four second icing protection heat exchangers 220a, 220b, 220c, 220d, and a fourth set 218b of ducts permitting the second icing protection liquid to flow from the second icing protection heat exchangers 220a, 220b, 220c, 220d to the second liquid-liquid heat exchanger 216.

The second cooling liquid forms a hot pass of the second liquid-liquid heat exchanger 216, and the second icing protection liquid forms the cold pass of the second liquid-liquid heat exchanger 216.

A second complementary heat exchanger 222 permits the second liquid-liquid heat exchanger 216 to be complemented or replaced, as explained above.

The first and second icing protection heat exchangers are grouped two by two, forming four sets 30a, 30b, 30c and 30d of heat exchangers. Each set of heat exchangers thus comprises at least two icing protection heat exchangers, each supplied by a different fuel cell in order to create the redundancy of the system for the event that one of the two fuel cells fails.

FIG. 3 shows an icing protection system 300 in accordance with a third embodiment of the invention.

In this third embodiment, the system comprises two fuel cells 312, 412 permitting redundancy in the icing protection function.

The icing protection function is implemented in this case in particular for an airfoil of an aircraft 324, comprising a first wing, or left wing 326a, and a second, right wing 326b.

The first fuel cell 312 is cooled by a first cooling liquid flowing in a first liquid circuit formed by ducts 314a and 314b.

A first icing protection liquid flows in a second liquid circuit formed by two ducts 318a, 318b in order to supply at least two, in this case two, first icing protection heat exchangers 320a, 320d.

The first cooling liquid forms a hot pass of a first liquid-liquid heat exchanger 316, and the first icing protection liquid forms the cold pass of the first liquid-liquid heat exchanger 316.

A first complementary heat exchanger 322 permits the first liquid-liquid heat exchanger 316 to be complemented or replaced, as explained above.

The second fuel cell 412 is cooled by a second cooling liquid flowing in a third liquid circuit formed by ducts 414a and 414b.

A second icing protection liquid flows in a fourth liquid circuit formed by two ducts 418a, 418b in order to supply at least two, in this case two, second icing protection heat exchangers 320b, 320c.

The second cooling liquid forms a hot pass of a second liquid-liquid heat exchanger 416, and the second icing protection liquid forms the cold pass of the second liquid-liquid heat exchanger 416.

A second complementary heat exchanger 422 permits the second liquid-liquid heat exchanger 216 to be complemented or replaced, as explained above.

Each fuel cell 312, 412 thus supplies two heat exchangers, the heat exchangers supplied by a fuel cell being distributed on both sides of the airfoil of the aircraft.

In particular, in this embodiment, the first fuel cell 312 supplies the heat exchanger 320a arranged on the outer leading edge of the left wing 326a and the heat exchanger 320d arranged at the outer leading edge of the right wing 326b. The second fuel cell 412 supplies the heat exchanger 320b arranged on the inner leading edge of the left wing 326a and the heat exchanger 320c arranged at the inner leading edge of the right wing 326b.

This configuration permits a certain symmetry in the use of the two fuel cells and in the protection of the wings from icing. The objective is e.g. to ensure that each wing of an aircraft is protected from icing at least by an icing protection heat exchanger and in a symmetrical manner in the event that one of the two fuel cells fails.

FIG. 4 schematically shows an icing protection system 400 in accordance with a fourth embodiment of the invention.

This system is similar to the icing protection system according to the third embodiment of the invention, and the references used are the same.

The difference between these two systems is that the icing protection system 400 according to the fourth embodiment of the invention includes redundancy and additional security for the event that one of the fuel cells fails: each cooling liquid of the fuel cells 312, 412 successively forms a hot pass of the two liquid-liquid heat exchangers 316, 416 by virtue of a crossed configuration of the cooling liquid circuits.

In particular, the first cooling liquid flows in a first liquid circuit formed of the ducts 314a, 314b and 314c so that, after having cooled the first fuel cell 312, it passes through the first liquid-liquid heat exchanger 316 thus forming a hot pass thereof, then passes through the second liquid-liquid heat exchanger 416 thus forming a hot pass thereof, then returns to the first fuel cell 312 in order to cool same.

Similarly, the second cooling liquid flows in a third liquid circuit formed by the ducts 414a, 414b and 414c so that, after having cooled the second fuel cell 412, it passes through the second liquid-liquid heat exchanger 416 thus forming a hot pass thereof, then passes through the first liquid-liquid heat exchanger 316 thus forming a hot pass thereof, then returns to the second fuel cell 412 in order to cool same.

This crossed and redundant configuration with a double hot pass can also be adapted to the second embodiment as described with reference to FIG. 2.

The invention is not limited to the embodiments described. In particular, the icing protection system can comprise more than two fuel cells, more than four heat exchangers, the heat exchangers can be disposed differently, etc. The embodiments described with reference to FIGS. 3 and 4 can be applied to any type of symmetrical configuration, e.g. in an aircraft on the horizontal stabilizer, or on other vehicles where a symmetry in the heat exchangers permits problems to be overcome in the event that one of the fuel cells fails.

The invention claimed is:

1. A system for protecting an outer surface of an aircraft from icing, comprising at least a first fuel cell and a second fuel cell, the system comprising:
    at least a first liquid circuit configured to cause a first cooling liquid of the first fuel cell to flow,
    at least a second liquid circuit configured to cause a first icing protection liquid to flow,
    at least a third liquid circuit configured to cause a second cooling liquid of the second fuel cell to flow,
    at least a fourth liquid circuit configured to cause a second icing protection liquid to flow,
    at least one first icing protection heat exchanger arranged on the outer surface of the aircraft to be protected and configured to have the first icing protection liquid pass through it when it flows in the second liquid circuit, and one second icing protection heat exchanger arranged on the outer surface of the aircraft to be protected and configured to have the second icing protection liquid pass through it when it flows in the fourth liquid circuit, and
    at least a first liquid-liquid heat exchanger, in which the first cooling liquid forms a hot pass and the first icing protection liquid forms a cold pass, so as to reheat the first icing protection liquid by transmission of heat coming from the first cooling liquid of the first fuel cell, and a second liquid-liquid heat exchanger in which the second cooling liquid forms a hot pass and the second icing protection liquid forms a cold pass, so as to reheat the second icing protection liquid by transmission of heat coming from the second cooling liquid of the second fuel cell.

2. The icing protection system as claimed in claim 1, wherein at least one icing protection heat exchanger is a skin heat exchanger configured to be arranged on the outer surface of the aircraft in direct contact with the outside of the aircraft.

3. The icing protection system as claimed in claim 2, wherein at least one icing protection heat exchanger is arranged on the airfoil of the aircraft, and at least partly forms a leading edge of the airfoil.

4. The icing protection system as claimed in claims 1, wherein the first cooling liquid forms an additional hot pass of the second liquid-liquid heat exchanger, and the second cooling liquid forms an additional hot pass of the first liquid-liquid heat exchanger.

5. The icing protection system as claimed in claims 1, wherein the system comprises at least one set of heat exchangers, each set of heat exchangers comprising a first icing protection heat exchanger configured to have the first icing protection liquid pass through it and a second icing protection heat exchanger configured to have the second icing protection liquid pass through it, the first icing protection heat exchanger and the second icing protection heat exchanger of the same set of heat exchangers being arranged to protect the same outer surface of the aircraft from icing.

6. The icing protection system as claimed in claims 1, wherein the system comprises a complementary heat exchanger arranged in at least one of the liquid circuits, wherein the cooling liquid of the fuel cell forms a hot pass.

7. A method for protecting an outer surface of an aircraft from icing, the method comprising:
transferring heat from a first fuel cell to a first cooling liquid of the first fuel cell,
transferring heat from a second fuel cell to a second cooling liquid of the second fuel cell,
transferring heat from the first cooling liquid to a first icing protection liquid in a first liquid-liquid heat exchanger,
transferring heat from the second cooling liquid to a second icing protection liquid in a second liquid-liquid heat exchanger,
transferring heat from the first icing protection liquid to a first icing protection heat exchanger arranged on the outer surface of the aircraft to be protected, transferring heat from the second icing protection liquid to a second icing protection heat exchanger arranged on the outer surface of the aircraft to be protected.

8. The method as claimed in claim 7, further comprising controlling an increase in heat production by at least one fuel cell.

9. An aircraft comprising at least one outer surface, it comprising a system for protecting said at least one outer surface from icing
for protecting an outer surface of an aircraft from icing, comprising at least a first fuel cell and a second fuel cell, the system comprising:
at least a first liquid circuit configured to cause a first cooling liquid of the first fuel cell to flow,
at least a second liquid circuit configured to cause a first icing protection liquid to flow,
at least a third liquid circuit configured to cause a second cooling liquid of the second fuel cell to flow,
at least a fourth liquid circuit configured to cause a second icing protection liquid to flow,
at least one first icing protection heat exchanger arranged on the outer surface of the aircraft to be protected and configured to have the first icing protection liquid pass through it when it flows in the second liquid circuit, and one second icing protection heat exchanger arranged on the outer surface of the aircraft to be protected and configured to have the second icing protection liquid pass through it when it flows in the fourth liquid circuit, and
at least a first liquid-liquid heat exchanger, in which the first cooling liquid forms a hot pass and the first icing protection liquid forms a cold pass, so as to reheat the first icing protection liquid by transmission of heat coming from the first cooling liquid of the first fuel cell, and a second liquid-liquid heat exchanger in which the second cooling liquid forms a hot pass and the second icing protection liquid forms a cold pass, so as to reheat the second icing protection liquid by transmission of heat coming from the second cooling liquid of the second fuel cell.

10. The aircraft as claimed in claim 9, wherein an outer surface comprises at least two symmetrical zones, each zone being protected from icing by at least two icing protection heat exchangers of a protection system comprising at least two fuel cells, at least one icing protection heat exchanger being configured to have the first icing protection liquid pass through it and at least one second icing protection heat exchanger configured to have the second icing protection liquid pass through it.

* * * * *